(12) United States Patent
Al-Dahle et al.

(10) Patent No.: US 9,268,433 B2
(45) Date of Patent: Feb. 23, 2016

(54) DEVICES AND METHODS FOR REDUCING POWER USAGE OF A TOUCH-SENSITIVE DISPLAY

(71) Applicant: APPLE INC., Cupertino, CA (US)

(72) Inventors: Ahmad Al-Dahle, Santa Clara, CA (US); Hopil Bae, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 248 days.

(21) Appl. No.: 13/664,086

(22) Filed: Oct. 30, 2012

(65) Prior Publication Data

US 2013/0328797 A1  Dec. 12, 2013

Related U.S. Application Data

(60) Provisional application No. 61/657,661, filed on Jun. 8, 2012.

(51) Int. Cl.
  *G06F 3/041* (2006.01)
  *G06F 1/32* (2006.01)
  *G09G 3/36* (2006.01)

(52) U.S. Cl.
  CPC ............ *G06F 3/0416* (2013.01); *G06F 1/3262* (2013.01); *G06F 1/3265* (2013.01); *G09G 3/3648* (2013.01); *G09G 2330/021* (2013.01); *G09G 2340/0435* (2013.01); *Y02B 60/1242* (2013.01)

(58) Field of Classification Search
  None
  See application file for complete search history.

(56) References Cited

U.S. PATENT DOCUMENTS

| | | |
|---|---|---|
| 2007/0075925 A1 | 4/2007 | Hung et al. |
| 2008/0055318 A1* | 3/2008 | Glen ............................. 345/501 |
| 2008/0143729 A1 | 6/2008 | Wyatt et al. |
| 2009/0207154 A1* | 8/2009 | Chino .......................... 345/175 |
| 2011/0254802 A1* | 10/2011 | Philipp ........................ 345/174 |
| 2011/0260992 A1 | 10/2011 | Hung et al. |
| 2012/0038585 A1* | 2/2012 | Kim .............................. 345/174 |
| 2012/0287093 A1* | 11/2012 | Gotoh et al. .................. 345/204 |
| 2013/0069895 A1* | 3/2013 | Lo et al. ........................ 345/173 |
| 2013/0176251 A1* | 7/2013 | Wyatt et al. ................... 345/173 |

* cited by examiner

*Primary Examiner* — Amr Awad
*Assistant Examiner* — Donna Lui
(74) *Attorney, Agent, or Firm* — Fletcher Yoder PC

(57) ABSTRACT

Methods and devices employing circuitry for reducing power usage of a touch-sensitive display are provided. In one example, a method for reducing power usage of a touch-sensitive display may include receiving power for the display of an electronic device. The method may also include powering a touch subsystem and a display subsystem of the display. The method may include, in a standard display mode, receiving synchronization signals at a first rate. A frame of data is stored on pixels of the display subsystem between each synchronization signal. The method may also include, in a low power display mode, receiving synchronization signals at a second rate. The second rate is less than the first rate. The method may include detecting a touch of the display via the touch subsystem between each synchronization signal.

25 Claims, 7 Drawing Sheets

DEVICES AND METHODS FOR REDUCING POWER USAGE OF A TOUCH-SENSITIVE DISPLAY

CROSS REFERENCE TO RELATED APPLICATIONS

This application is a Non-Provisional Patent Application of U.S. Provisional Patent Application No. 61/657,661, entitled "Devices and Methods for Reducing Power Usage of a Touch-Sensitive Display", filed Jun. 8, 2012, which are herein incorporated by reference.

BACKGROUND

The present disclosure relates generally to electronic devices and, more particularly, to reducing power usage of a touch-sensitive display of the electronic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including consumer electronics such as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts where it is desirable to minimize power usage.

Typically, touch-sensitive LCD panels include an array of pixels for displaying images. Image data related to each pixel may be sent by a processor to the LCD panel through a driver integrated circuit (IC). The driver IC then processes the image data and transmits corresponding voltage signals to the individual pixels. The touch-sensitive LCD panels may also include touch input sensing and processing electronics such as capacitive arrays and touch controllers. Both the display panel, as well as the touch sensing electronics may add to the power consumption of the touch-sensitive LCD panel.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for reducing power usage of a touch-sensitive display. By way of example, a method for reducing power usage of a touch-sensitive display may include receiving power for the display of an electronic device. The method may also include powering a touch subsystem and a display subsystem of the display. The method may include, in a standard display mode, receiving synchronization signals at a first rate. A frame of data is stored on pixels of the display subsystem between each synchronization signal. The method may also include, in a low power display mode, receiving synchronization signals at a second rate. The second rate is less than the first rate. The method may include detecting a touch of the display via the touch subsystem between each synchronization signal.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
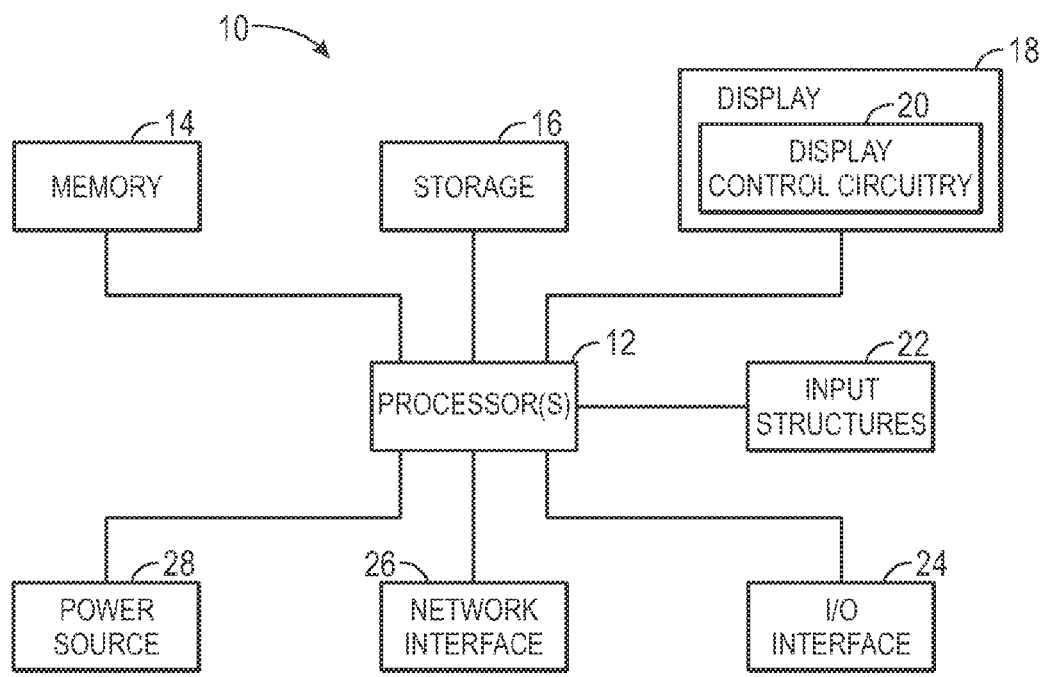
FIG. 1 is a block diagram of exemplary components of an electronic device, in accordance with present embodiments.
Figure 2:
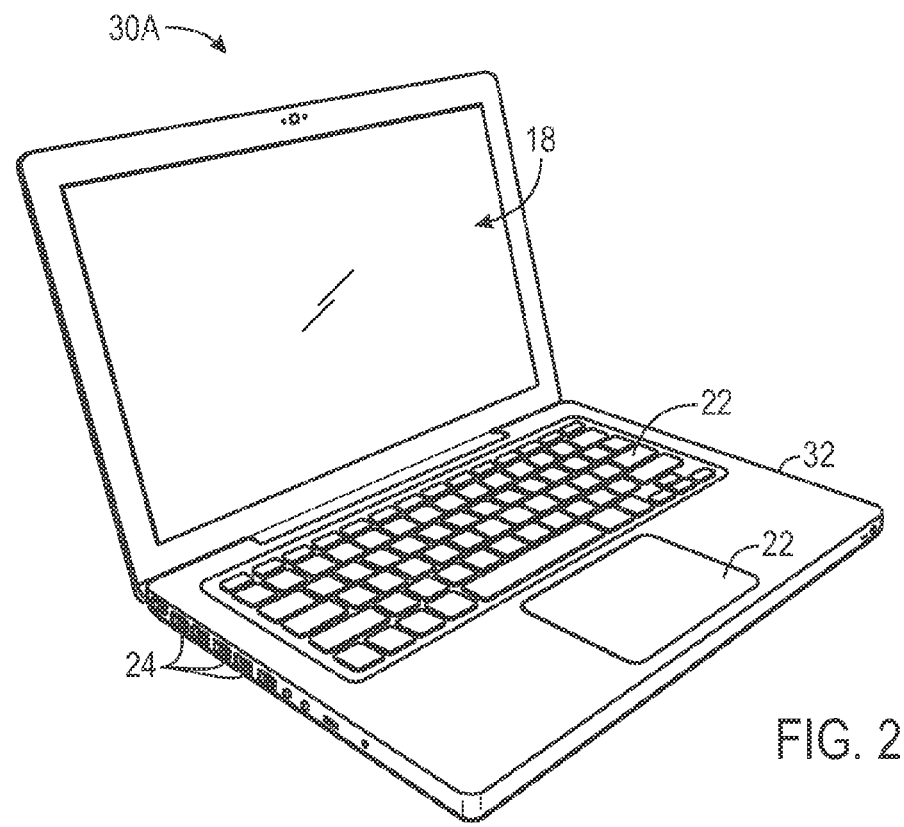
FIG. 2 is a perspective view of a notebook computer representing an embodiment of the electronic device of FIG. 1.
Figure 3:
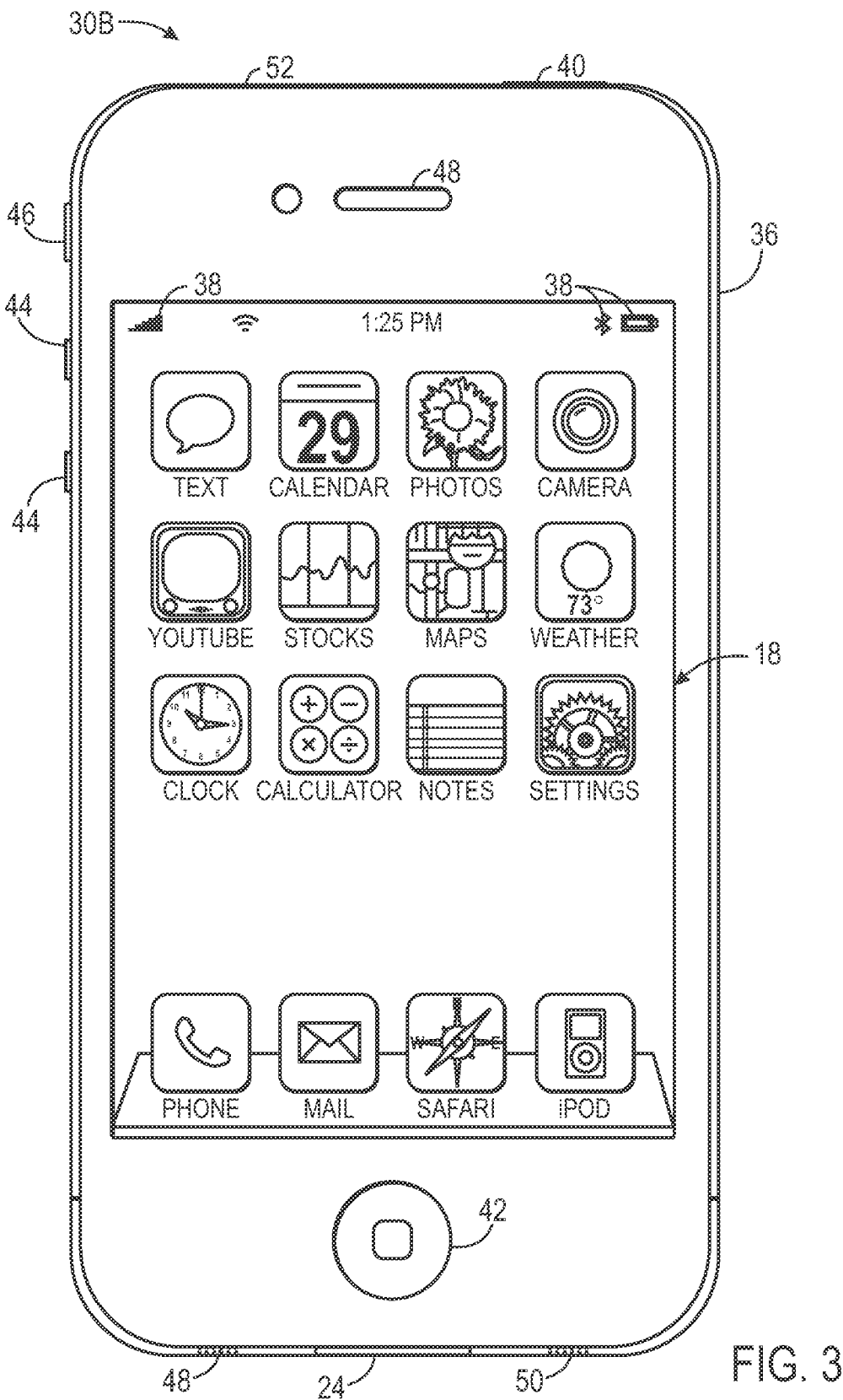
FIG. 3 is a front view of a handheld device representing another embodiment of the electronic device of FIG. 1.
Figure 4:
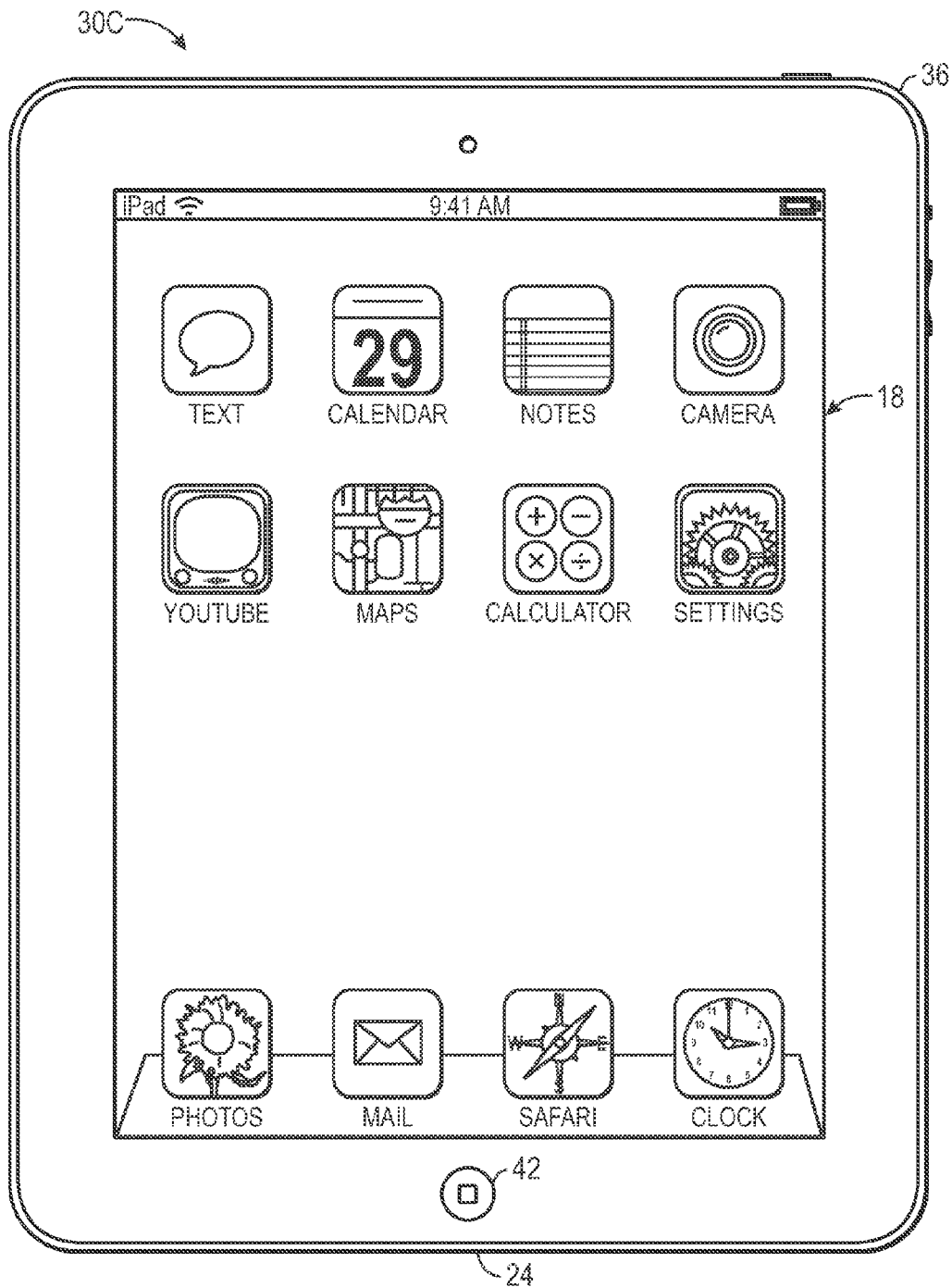
FIG. 4 is a front view of a tablet computing device representing another embodiment of the electronic device of FIG. 1.

With the foregoing in mind, a general description of suitable electronic devices that may employ touch-sensitive displays having capabilities to operate in a reduced power mode will be provided below. In particular, FIG. 1 is a block diagram depicting various components that may be present in an electronic device suitable for use with such a display. FIGS. 2, 3, and 4 respectively illustrate perspective and front views of a suitable electronic device, which may be, as illustrated, a notebook computer, handheld electronic device, or a tablet computing device.

Turning first to FIG. 1, an electronic device 10 according to an embodiment of the present disclosure may include, among other things, one or more processor(s) 12, memory 14, nonvolatile storage 16, a display 18 having display control circuitry 20 for reducing power usage in a reduced power mode, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10. As will be appreciated, when a touch-sensitive display is operating in a mode where the display does not need to be updated at a high frequency, an unnecessary amount of power may be consumed by the display. As such, embodiments of the present disclosure may be employed to decrease the power consumption of the touch-sensitive display.

By way of example, the electronic device 10 may represent a block diagram of the notebook computer depicted in FIG. 2, the handheld device depicted in FIG. 3, the tablet computing device depicted in FIG. 4, or similar devices. It should be noted that the processor(s) 12 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10. As presented herein, the data processing circuitry may control the power consumption of the electronic display 18 by controlling a display subsystem and touch subsystem of the electronic display 18 to operate in a standard display mode, a low power display mode, or to switch between operating in one of the standard display mode and the low power display mode.

In the electronic device 10 of FIG. 1, the processor(s) 12 and/or other data processing circuitry may be operatively coupled with the memory 14 and the nonvolatile memory 16 to execute instructions. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12.

The display 18 may be a touch-screen (e.g., touch-sensitive) liquid crystal display (LCD), for example, which may allow users to interact with a user interface of the electronic device 10. In some embodiments, the electronic display 18 may be a MultiTouch™ display that can detect multiple touches concurrently. For example, the display 18 may be a capacitive-touch-sensitive display capable of detecting projected capacitive touch (PCT) touch input gestures, such as a single touch, a double touch, a drag, a flick, a pinch, a rotate, a zoom, or combinations thereof. As will be described further detail, to reduce the overall power consumption of the display 18, the display control circuitry 20 may be configured to control the display 18 to operate in one or more of a standard display mode and a low power display mode. Specifically, the display control circuitry 20 may be configured to receive one or more synchronization signals that control the frequency that image data is stored on pixels of the display 18, and thereby may be used to control various aspects relating to power consumption of the display 18.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing 32, a display 18, input structures 22, and ports of an I/O interface 24. In one embodiment, the input structures 22 (such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on the display 18. Further, the display 18 may include the display control circuitry 20 for reducing power of the display 18, such as when the display control circuitry 20 receives an indication that the display 18 should operate in a low power display mode.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif. In other embodiments, the electronic device 10 may also be a tablet computing device 30C, as illustrated in FIG. 4. For example, the tablet computing device 30C may be a model of an iPad® available from Apple Inc.

The handheld device 30B may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 30B. For example, the input structure 40 may activate or deactivate the handheld device 30B, the input structure 42 may navigate a user interface to a home screen, a user-configurable application screen, and/or activate a voice-recognition feature of the handheld device 30B, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. As also noted above, to reduce the power consumption of the display 18, the display control circuitry 20 may be configured to receive one or more synchronization signals that control the frequency that image data is stored on pixels of the display 18, and thereby may be used to control various aspects relating to power consumption of the display 18.

Figure 5:
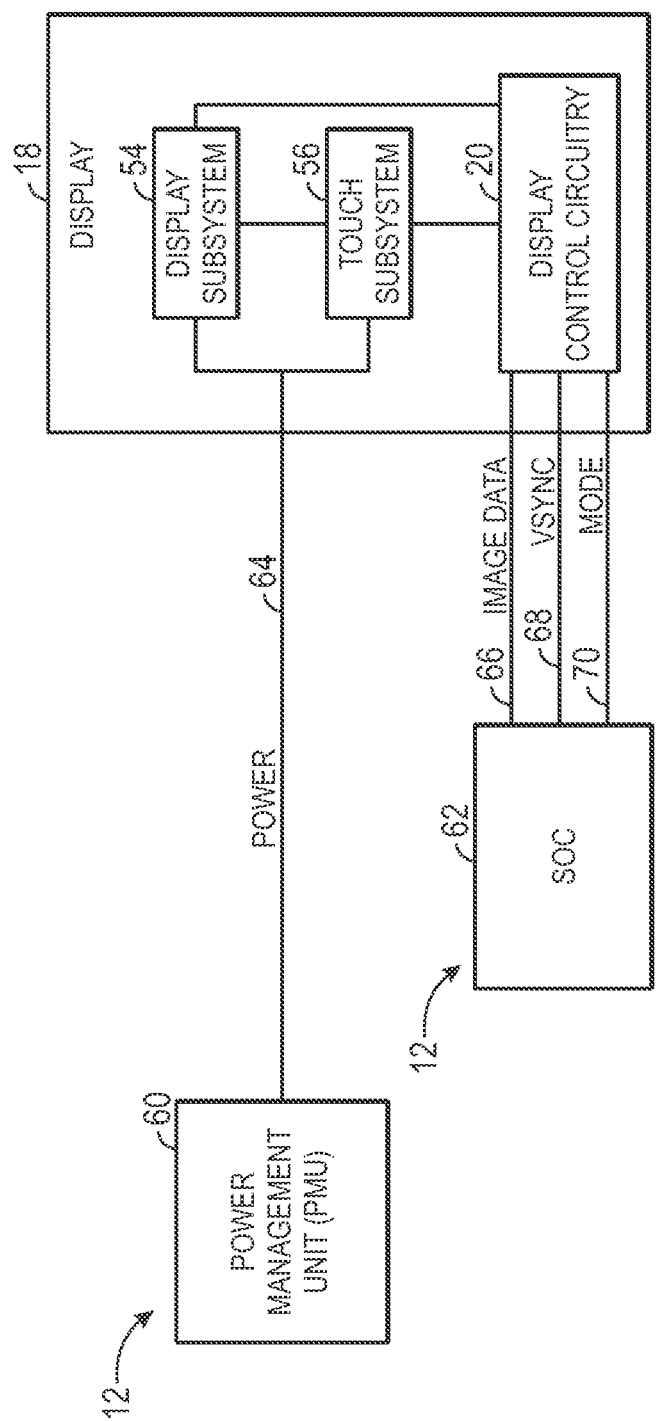
FIG. 5 is a circuit diagram of components of an electronic device, in accordance with present embodiments.

Various components of the electronic device 10 may be used to control the power consumption of the display 18. Accordingly, FIG. 5 is an embodiment of a circuit diagram of certain components of the electronic device 10 that may be used to control the power consumption of the display 18. As illustrated, the electronic device 10 may include the display 18 and various processors 12. Specifically, the display 18 includes a display subsystem 54 and a touch subsystem 56. The display subsystem 54 is configured to receive and display image data, while the touch subsystem 56 is configured to sense touches of the display 18. In the present embodiment, the display control circuitry 20 may be communicatively coupled to the display subsystem 54 and the touch subsystem 56. Although the display subsystem 54, the touch subsystem 56, and the display control circuitry 20 are illustrated separately, they are intended to indicate functionality of the display 18 as opposed to separate physical components of the display 18. Accordingly, physical components of the display 18 may be in one or more of the display subsystem 54, the touch subsystem 56, and the display control circuitry 20.

As illustrated, the processors 12 may include a power management unit (PMU) 60 and a system on chip (SOC) 62. The PMU 60 may be used to manage the power of the electronic device 10, and may control when power is supplied to, and removed from, other components of the electronic device 10. For example, the PMU 60 may supply power 64 to the display 18. Specifically, the PMU 60 may supply power 64 to both the display subsystem 54 and the touch subsystem 56.

As illustrated, the SOC 62 provides image data 66 to the display 18. Furthermore, the SOC 62 provides a synchronization signal 68 (e.g., VSYNC) to the display 18 to cause the display 18 to refresh image data stored in pixels of the display 18. In certain embodiments, the SOC 62 may be used to control the display 18 to operate in various power modes. For example, the SOC 62 may be used to control the display 18 to operate in a standard display mode or a low power display mode. Particularly, as used herein, the "standard display mode" may refer to a display mode in which power consumed by the display subsystem 54 and the touch subsystem 56 is a combination of power used for image displaying and touch sensing under normal operating conditions. Furthermore, the "low power display mode" may refer to a display mode in which power consumed by the display subsystem 54 and the touch subsystem 56 is substantially less than the power consumed in the standard display mode.

In certain embodiments, the display 18 may transition between the standard display mode and the low power display mode by changing the rate that the synchronization signal 68 is provided to the display 18. For example, during the standard display mode, the SOC 62 may provide the synchronization signal 68 to the display 18 at a standard rate (e.g., at a frequency of approximately 60 Hertz (Hz)). On the other hand, during the low power display mode, the SOC 62 may provide the synchronization signal 68 to the display at a rate that is less than the standard rate (e.g., at a frequency of approximately 15 Hz). By the SOC 62 providing synchronization signals 68 at a rate lower than a standard rate, the image data stored on pixels of the display 18 is updated less frequently, thus using less power to operate the display subsystem 54. As a result, the overall power consumption of the display 18 may be reduced.

In some embodiments, the SOC 62 may provide synchronization signals 68 to the display 18 at a standard rate during both the standard display mode and the low power display mode. In such an embodiment, the SOC 62 may provide the display 18 with a mode signal 70 that controls whether the display 18 is operating in the standard display mode or the low power display mode. When controlled to operate in the standard display mode, the display 18 may operate normally. In contrast, when controlled to operate in the low power display mode, the display 18 may reduce the rate that image data stored on pixels of the display 18 is updated by skipping one or more synchronization signals 68 received. For example, the display 18 may skip every other synchronization signals 68 received. As another example, the display 18 may skip every third synchronization signals 68 received. By the display 18 skipping synchronization signals 68 received, the image data stored on pixels of the display 18 is updated less frequently, thus using less power to operate the display subsystem 54. As a result, the overall power consumption of the display 18 may be reduced. As may be appreciated, one or more of the image data 66, the synchronization signal 68, and the mode signal 70 may be provided from the SOC 62 to the display 18 via a communication link (e.g., via a mobile industry processor interface (MIPI)).

Figure 6:
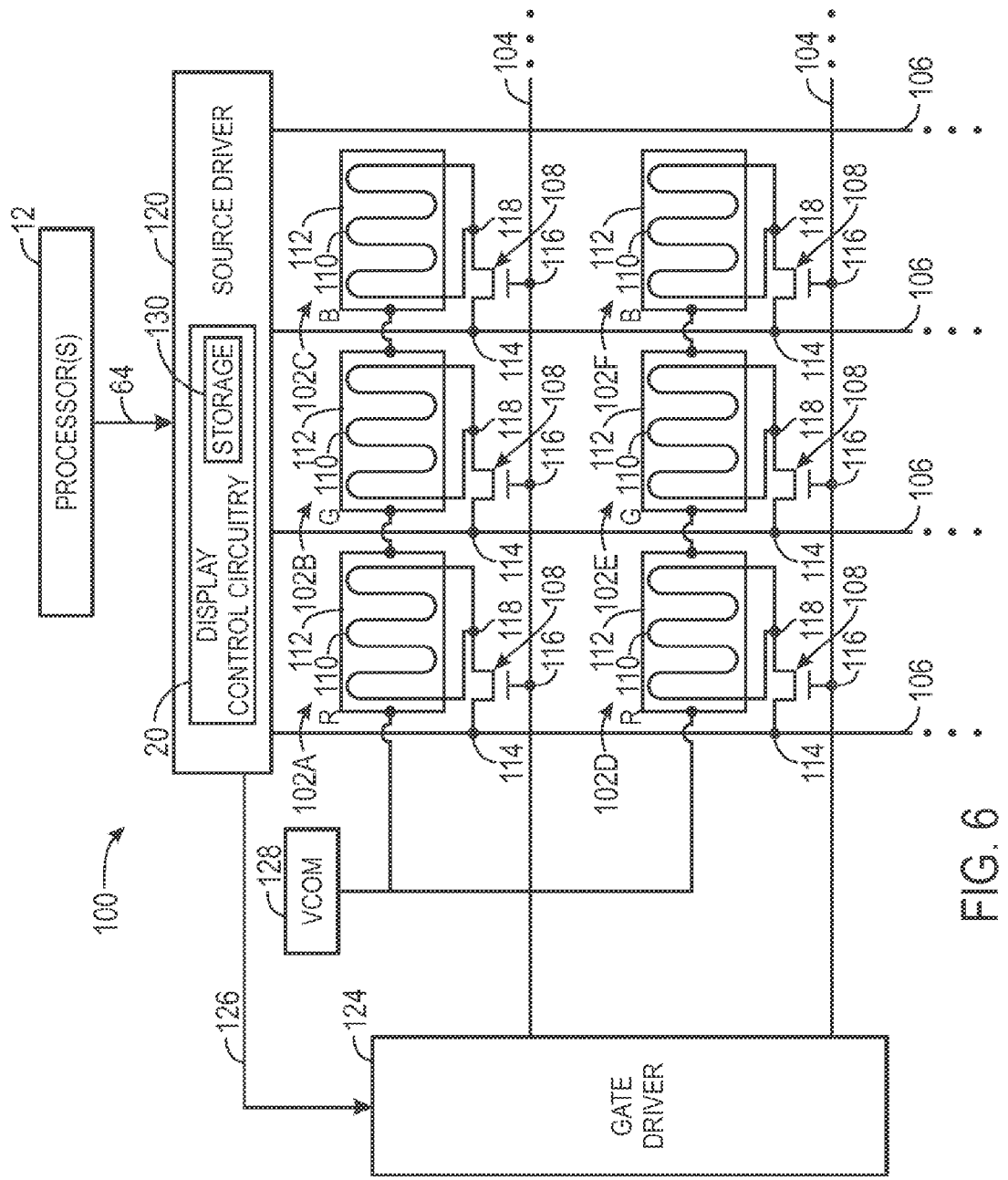
FIG. 6 is a circuit diagram illustrating display circuitry of an electronic device, in accordance with present embodiments.

Among the various components of an electronic display 18 may be a pixel array 100, as shown in FIG. 6. As illustrated, FIG. 6 generally represents a circuit diagram of circuitry of the display 18. In particular, the pixel array 100 of the display 18 may include a number of unit pixels 102 disposed in a pixel array or matrix. In such an array, each unit pixel 102 may be defined by the intersection of rows and columns, represented by gate lines 104 (also referred to as scanning lines), and source lines 106 (also referred to as data lines), respectively. Although only six unit pixels 102, referred to individually by the reference numbers 102A-102F, respectively, are shown for purposes of simplicity, it should be understood that in an actual implementation, each source line 106 and gate line 104 may include hundreds or thousands of such unit pixels 102. Each of the unit pixels 102 may represent one of three subpixels that respectively filters only one color (e.g., red, blue, or green) of light. For purposes of the present disclosure, the terms "pixel," "subpixel," and "unit pixel" may be used largely interchangeably. Further, in certain embodiments, pixel data supplied to the pixels 102 of the display 18 may be considered a "frame" of pixel data.

In the presently illustrated embodiment, each unit pixel 102 includes a thin film transistor (TFT) 108 for switching a data signal supplied to a respective pixel electrode 110. The potential stored on the pixel electrode 110 relative to a potential of a common electrode 112, which may be shared by other pixels 102, may generate an electrical field sufficient to alter the arrangement of a liquid crystal layer of the display 18. In the depicted embodiment of FIG. 6, a source 114 of each TFT 108 may be electrically connected to a source line 106 and a gate 116 of each TFT 108 may be electrically connected to a gate line 104. A drain 118 of each TFT 108 may be electrically connected to a respective pixel electrode 110. Each TFT 108 may serve as a switching element that may be activated and deactivated for a period of time based on the respective presence or absence of a scanning or activation signal on the gate lines 104 that are applied to the gates 116 of the TFTs 108.

When activated, a TFT 108 may store the image signals (e.g., image data signal 66) received via the respective source line 106 as a charge upon its corresponding pixel electrode 110. As noted above, the image signals stored by the pixel electrode 110 may be used to generate an electrical field between the respective pixel electrode 110 and a common electrode 112. This electrical field may align the liquid crystal molecules within the liquid crystal layer to modulate light transmission through the pixel 102. Thus, as the electrical field changes, the amount of light passing through the pixel 102 may increase or decrease. In general, light may pass through the unit pixel 102 at an intensity corresponding to the applied voltage from the source line 106.

The display 18 also may include a source driver integrated circuit (IC) 120, which may include a processor, microcontroller, or application specific integrated circuit (ASIC), that controls the display pixel array 100 by receiving image data 66 from the processor(s) 12 and sending corresponding image signals to the unit pixels 102 of the pixel array 100. It should be understood that the source driver 120 may be a chip-on-glass (COG) component on a TFT glass substrate, a component of a display flexible printed circuit (FPC), and/or a component of a printed circuit board (PCB) that is connected to the TFT glass substrate via the display FPC. Further, the source driver 120 may include any suitable article of manufacture having one or more tangible, computer-readable media for storing instructions that may be executed by the source driver 120. In addition, the source driver 120 may include the display control circuitry 20. In some embodiments, the display control circuitry 20 is not part of the source driver 120.

The source driver 120 also may couple to a gate driver integrated circuit (IC) 124 that may activate or deactivate rows of unit pixels 102 via the gate lines 104. As such, the source driver 120 may provide timing signals 126 to the gate driver 124 to facilitate the activation/deactivation of individual rows (i.e., lines) of pixels 102. In other embodiments, timing information may be provided to the gate driver 124 in some other manner. The display 18 may include a Vcom source 128 to provide a Vcom output to the common electrodes 112. In some embodiments, the Vcom source 128 may supply a different Vcom to different common electrodes 112 at different times. In other embodiments, the common electrodes 112 all may be maintained at the same potential (e.g., a ground potential) while the display 18 may be on.

In certain embodiments, the display control circuitry 20 may store instructions in a storage device 130. The instructions may be used to control the display 18 to operate in one of the standard display mode, the low power display mode, or to switch between the standard display mode and the low power display mode. Such instructions may be based on the receipt of the mode signal 70, as described above. In embodiments that do not include the mode signal 70, such instructions may not be necessary because the change in rate of the synchronization signals 68 automatically produces the desired results (e.g., changes the rate that data is stored in pixels 102). As may be appreciated, the storage device 130 may be any suitable article of manufacture having a tangible, computer-readable media for storing instructions for the display control circuitry 20. For example, the storage device 130 may be an EEPROM device. It should be noted that the display 18 may receive and detect touch inputs during the standard display mode and the low power display mode.

Figure 7:
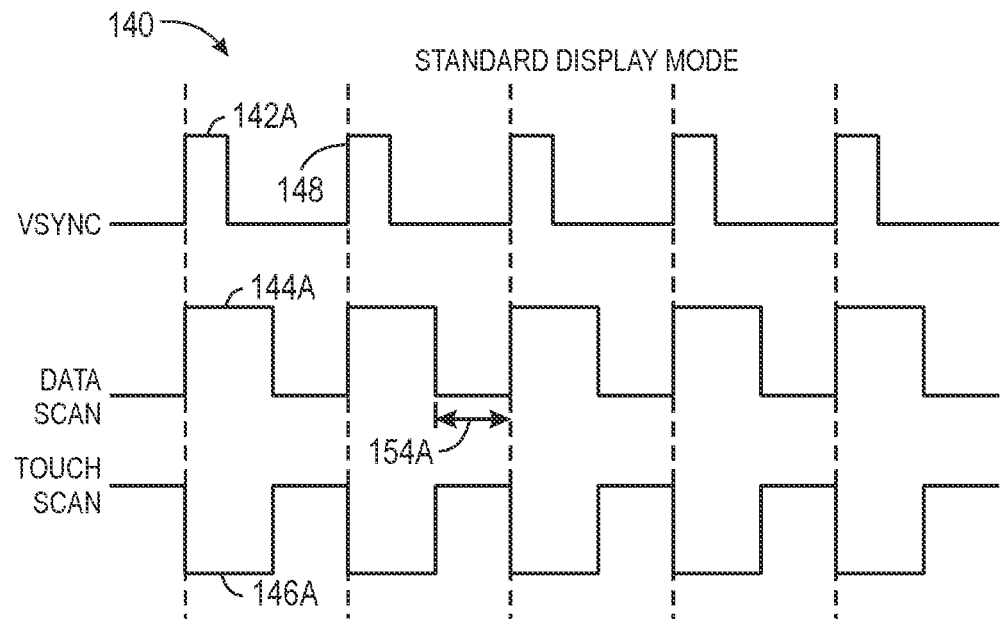
FIG. 7 is a timing diagram illustrating a standard display mode, in accordance with present embodiments.

FIG. 7 illustrates a timing diagram 140 that shows the timing of a synchronization signal 142A (e.g., VSYNC), data scan 144A, and a touch scan 146A (e.g., a time period where the display 18 scans for a touch) in the standard display mode. In certain embodiments, the synchronization signal 142A may include rising edges 148, which may each be detected by the display 18 to identify when a data scan 144A should begin. The logical high portions of the data scan 144A may represent time periods where a frame of data is stored in pixels 102 of the display 18. In the illustrated embodiment, the rising edges 148 of the synchronization signals 142A may occur at a standard rate (e.g., approximately 60 Hz). Consequentially, the data scans 144A may also occur at the standard rate. As may be appreciated, the data scans 144A may include a blanking period 154A (e.g., a time period where data is not stored in pixels 102 of the display 18), which may be represented as the logic low portions between the logical high portions of the data scans 144A. For example, in the standard display mode, the blanking periods 154A may be approximately 5 ms, 10 ms, 16 ms, 32 ms, and so forth.

In certain embodiments, for example, blanking periods 154A may be proportional to the refresh rate of the display 18 operating in the standard display mode (e.g., at a refresh rate of approximately 60 Hz, the time blanking periods 154A may be approximately 16 ms). In other embodiments, for example, the blanking periods 154A may be substantially the time it may take for the display control circuitry 20 to store a frame of pixel data in the pixels 102 of the display 18 (e.g., the time that the data scan 144A is logically high). In the present embodiment, the touch scan 146A may be performed during any time period where the touch scan 146A is logically high (e.g., during the blanking periods 154A), such that touch inputs on the display 18 may be sensed between the times that the display 18 is refreshed with frames of pixel data. In certain embodiments, the touch scan 146A may be controlled to be logically high during a front porch portion of the blanking periods 154A.

Figure 8:
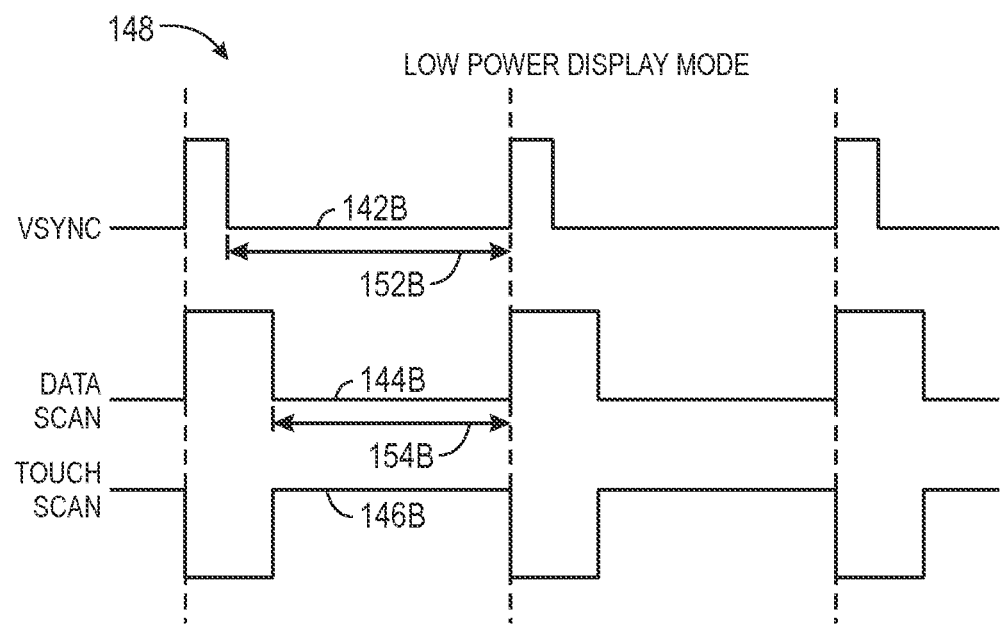
FIG. 8 is a timing diagram illustrating a low power display mode, in accordance with present embodiments.

In certain embodiments, the frequency of the synchronization signal 142A may be reduced, such that the data scan 144A may include longer (e.g., extended) blanking periods 154A to reduce power consumption of the display 18. For example, FIG. 8 illustrates an embodiment of a timing diagram 148 that shows the timing of a synchronization signal 142B, data scan 144B, and a touch scan 146B in the low power display mode. Moreover, the synchronization signal 142B is provided to the display 18 at a rate lower than that provided in the standard display mode. As depicted, the logical high portions of the data scan 144B are delayed by the blanking periods 154B. Therefore, the length of time of the logic high portions of the touch scan 146B is increased up to approximately the time of the blanking periods 154. For example, if the blanking periods 154 were approximately 50 ms, the touch scan 146A may be driven to logical highs during for approximately 50 ms. Thus, in the low power display mode, the display 18 may receive and/or store frames of pixel data at a reduced rate. Accordingly, power consumed by receiving and/or storing pixel data may be reduced. Therefore, the overall power consumption of the display 18 may be reduced (e.g., while the display 18 is in a primarily touch sensing mode).

Figure 9:
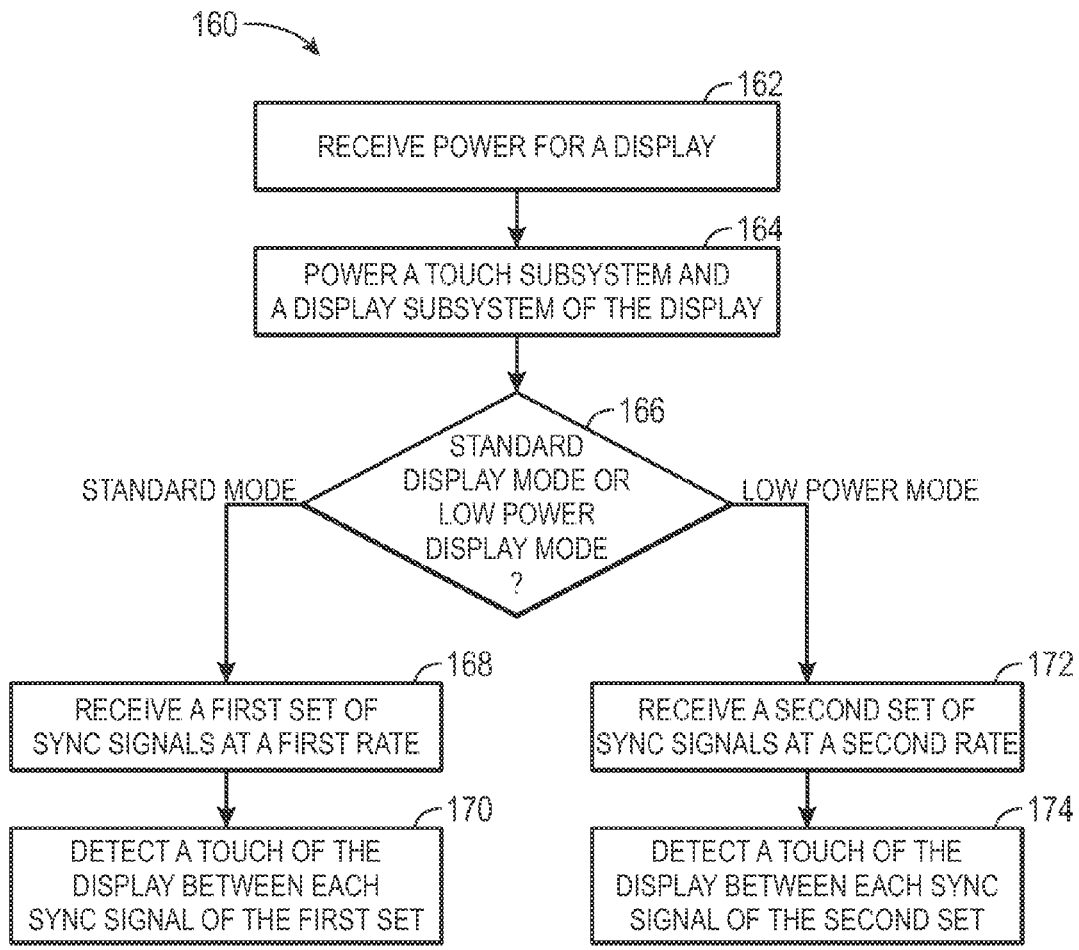
FIG. 9 is a flowchart describing a method of operating the electronic device of FIG. 1 in a standard display mode and a low power display mode, in accordance with present embodiments.

Turning now to FIG. 9, a flowchart is presented, illustrating an embodiment of a method 160 for reducing power consumption in the display 18 (e.g., a touch-sensitive display). In certain embodiments, the method 160 may be executed by code (e.g., instructions) stored in the storage 130 of the display control circuitry 20. The method 160 includes receiving power to power the display 18 to perform, for example, functions that may include displaying image data and/or receiving and processing touch inputs (block 162). Accordingly, the method 160 may also include powering the touch subsystem 56 (e.g., touch sensing and/or touch processing electronics) and the display subsystem 54 of the display 18 (block 164). A determination is made at block 166 as to whether the display 18 is operating in the standard display mode or the low power display mode. If the display 18 is operating in the standard display mode, the display 18 may receive at first set of synchronization signals 68 (e.g., VSYNC) at a first rate (e.g., 60 Hz) (block 168). The display 18 may also detect one or more touch inputs between each of the synchronization signals 68 of the first set of synchronization signals 68 received at the first rate (block 170). However, if operating in the low power display mode, the display 18 may receive a second set of synchronization signals 68 (e.g., VSYNC) at a second rate (e.g., 15 Hz) (block 172). The display 18 may also detect one or more touch inputs between each of the synchronization signals 68 of the second set of synchronization signals 68 received at the second rate (block 174). Accordingly, the method 160 may be useful in reducing the overall power consumption of the display 18 by, specifically, reducing the power consumption of the display subsystem 54, while sustaining the activity of the touch subsystem 56.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
   receiving power for a display of an electronic device;
   powering a touch subsystem and a display subsystem of the display using the received power;
   in a standard display mode, receiving a first plurality of vertical synchronization (VSYNC) signals at a first rate, wherein the first plurality of VSYNC signals are configured to initiate the storage of a frame of data on pixels of the display subsystem at the first rate; and
   in a low power display mode:
      receiving a second plurality of VSYNC signals at a second rate, wherein the second plurality of VSYNC signals are configured to initiate the storage of a frame of data on the pixels at the second rate; and
      detecting a touch of the display via the touch subsystem during an extended touch detection period at least partially defined according to the second plurality of VSYNC signals, wherein the second rate is less than the first rate, and wherein the extended touch detection period is the same as an extended blanking period of a data scan period corresponding to the second plurality of VSYNC signals.

2. The method of claim 1, comprising receiving the first plurality of VSYNC signals at a rate of approximately 60 Hz.

3. The method of claim 1, comprising receiving the second plurality of VSYNC signals at a rate of approximately 15 Hz.

4. The method of claim 1, wherein detecting the touch of the display comprises detecting a first touch and a second touch.

5. The method of claim 1, wherein detecting the touch of the display comprises performing a touch scan.

6. The method of claim 1, wherein detecting the touch of the display comprises performing a plurality of touch scans.

7. The method of claim 1, comprising storing the frame of data on pixels of the display subsystem between each VSYNC signal of the second plurality of VSYNC signals.

8. The method of claim 7, wherein the frame of data is stored on pixels of the display subsystem before detecting the touch of the display.

9. The method of claim 1, comprising detecting a touch of the display via the touch subsystem between each VSYNC signal of the first plurality of VSYNC signals.

10. The method of claim 1, comprising receiving a signal via the display indicating a change between the standard display mode and the low power display mode.

11. An electronic display comprising:
   a display subsystem comprising a plurality of pixels configured to display image data;
   a touch subsystem configured to sense a touch of the display; and
   display control circuitry configured to:
      receive a first plurality of vertical synchronization (VSYNC) signals at a first rate during a standard display mode, wherein the first plurality of VSYNC signals are configured to start the storage of a frame of pixel data on the plurality of pixels of the display subsystem at the first rate;
      receive a second plurality of VSYNC signals at a second rate during a low power display mode, wherein the second plurality of VSYNC signals are configured to start the storage of a frame of pixel data on the plurality of pixels at the second rate, and wherein the second rate is less than the first rate to reduce power consumed by the electronic display; and
      provide a frame of pixel data to the pixels of the display subsystem during a first data scan period between each VSYNC signal of the first plurality of VSYNC signals and during a second data scan period between each VSYNC signal of the second plurality of VSYNC signals, wherein the touch subsystem is configured to sense the touch of the display during a first touch detection period at least partially defined according to the first plurality of VSYNC signals and during a second touch detection period at least partially defined according to the second plurality of VSYNC signals, and wherein the second touch detection period is greater than the first touch detection period, and wherein the second touch detection period is the same as an extended blanking period of the second data scan period corresponding to the second plurality of VSYNC signals.

12. The electronic display of claim 11, wherein the display control circuitry is configured to receive a mode signal to indicate operation of the electronic display in the standard display mode or the low power display mode.

13. The electronic display of claim 11, wherein the display control circuitry is configured to operate in the standard display mode when the first plurality of VSYNC signals is received at the first rate and to operate in the low power display mode when the second plurality of VSYNC signals is received at the second rate.

14. An electronic display comprising:
an electronic display; and
a processor communicatively coupled to the electronic display and configured to:
in a standard display mode, provide a first frame of image data to the electronic display during a first period of time;
in a low power display mode, provide a second frame of image data to the electronic display during a second period of time, wherein the second period of time is greater than the first period of time; and
in the low power display mode, detect a touch of the electronic display during an extended touch detection period at least partially corresponding to a plurality of vertical synchronization (VSYNC) signals provided to the electronic display, wherein the plurality of VSYNC signals are configured to initiate the providing of the first frame of image data or the second frame of image data, and wherein the extended touch detection period is the same as an extended blanking period of a data scan period corresponding to the second plurality of VSYNC signals.

15. The electronic device of claim 14, wherein the processor is configured to provide the first frame of image data, the second frame of image data, the plurality of VSYNC signals, or a combination thereof, to the electronic display via a mobile industry processor interface (MIPI).

16. The electronic device of claim 14, wherein the first period of time is approximately 16 milliseconds and the second period of time is approximately 66milliseconds.

17. The electronic device of claim 14, wherein the processor is configured to detect the touch of the electronic display during a blanking period after each VSYNC signal of the plurality of VSYNC signals.

18. The electronic device of claim 14, wherein the electronic display is configured to disregard a portion of the plurality of VSYNC signals when operating in the low power display mode.

19. A method comprising:
in a standard display mode:
providing a plurality of vertical synchronization (VSYNC) signals to an electronic display at a first rate, wherein the plurality of VSYNC signals are configured to initiate the storage of a frame of data on pixels of the electronic display between each VSYNC signal of the plurality of VSYNC signals; and in a low power display mode:
providing the plurality of VSYNC signals to the electronic display at a second rate, wherein the second rate is less than the first rate; and d
detecting a touch of the electronic display during an expanded touch scan period at least partially defined according to the plurality of VSYNC signals, wherein the expanded touch scan period is the same as an expanded blanking period of a data scan period corresponding to the plurality of VSYNC signals.

20. The method of claim 19, wherein detecting the touch of the electronic display comprises detecting the touch of the electronic display after the frame of data is stored on pixels of the electronic display.

21. The method of claim 19, wherein detecting the touch of the electronic display comprises detecting a plurality of touches of the electronic display after the frame of data is stored on pixels of the electronic display.

22. The method of claim 19, comprising:
detecting the touch of the electronic display during a first blanking period of the plurality of VSYNC signals in the standard display mode; and
detecting the touch of the electronic display during a second blanking period of the plurality of VSYNC signals in the low power display mode, wherein the second blanking period is greater than the first blanking period to reduce power consumed by the electronic display.

23. A method comprising:
storing frames of data on pixels of a display at a first rate during a standard display mode, wherein the first rate corresponds to a first vertical synchronization (VSYNC) signal having a first frequency;
receiving a signal indicating for the display to transition to a low power display mode;
storing frames of data on pixels of the display at a second rate during the low power display mode, wherein the second rate corresponds to a second VSYNC signal having a second frequency, and wherein the second rate is less than the first rate; and
detecting a first touch of the display at a third rate greater than or equal to the second rate during the low power display mode, wherein detecting the first touch comprises detecting the first touch during a touch detection period that is the same as a blanking period between storing the frames of data on the pixels at the second rate, wherein the blanking period corresponds to the second VSYNC signal.

24. The method of claim 23, wherein receiving the signal comprises receiving a plurality of VSYNC signals at the second rate.

25. The method of claim 23, comprising detecting a second touch of the display at a fourth rate greater than or equal to the first rate during the standard display mode.

* * * * *